United States Patent [19]
Kanai et al.

[11] Patent Number: 5,187,628
[45] Date of Patent: Feb. 16, 1993

[54] THIN FILM MAGNETIC HEAD HAVING MAGNETIC ANISOTROPY WITH IN-PLANE AND PERPENDICULAR COMPONENTS

[75] Inventors: Hitoshi Kanai; Michiaki Kanamine; Kazuo Kobayashi, all of Kawasaki, Japan

[73] Assignee: Fujitsu Limited, Kanagawa, Japan

[21] Appl. No.: 765,742

[22] Filed: Sep. 26, 1991

[30] Foreign Application Priority Data

Oct. 12, 1990 [JP] Japan ................... 2-274513

[51] Int. Cl.⁵ .............................................. G11B 5/147
[52] U.S. Cl. ................................................. 360/126
[58] Field of Search ......................................... 360/126

[56] References Cited

U.S. PATENT DOCUMENTS

5,085,935  2/1992  Mallary ........................... 360/126 X

Primary Examiner—A. J. Heinz
Attorney, Agent, or Firm—Nikaido, Marmelstein, Murray & Oram

[57] ABSTRACT

A magnetic head of the invention comprises a substrate, upper and lower magnetic films forming a magnetic circuit on the substrate, the magnetic circuit having a narrow portion in width and forming a gap at the end of the magnetic circuit for interacting with a recording medium, and a coil surrounding the magnetic circuit and buried in an insulation layer between the upper and lower magnetic films. The magnetic head of the invention is characterized in that the magnetic films further comprise a magnetic anisotropy having components of an in-plane (parallel to the magnetic film surface) magnetic anisotropy Hp and a perpendicular (vertical to the magnetic film surface) magnetic anisotropy Hv, and the perpendicular magnetic anisotropy Hv is given to the magnetic film by anyone among utilization of an inverse magnetostriction effect, an induced magnetic anisotropy and a crystalline magnetic anisotropy.

13 Claims, 6 Drawing Sheets

THIN FILM MAGNETIC HEAD HAVING MAGNETIC ANISOTROPY WITH IN-PLANE AND PERPENDICULAR COMPONENTS

BACKGROUND OF THE INVENTION

1. Field of the Invention

The present invention relates to a thin film magnetic head, and more particularly to a composition of the thin film magnetic head used for magnetic disk apparatus in a computer system. The magnetic head of the invention can reduce spurious and transient noise pulses comprised in a reproduced signal during a read operation, and therefore is useful in field which requires a high reliability in the output signal from the magnetic head.

2. Description of the Related Art

With a trend toward higher recording density and larger storage capacity of a disk apparatus, a thin film magnetic head used therein is required to have high reliability and high performance in operation.

Figure 1A:
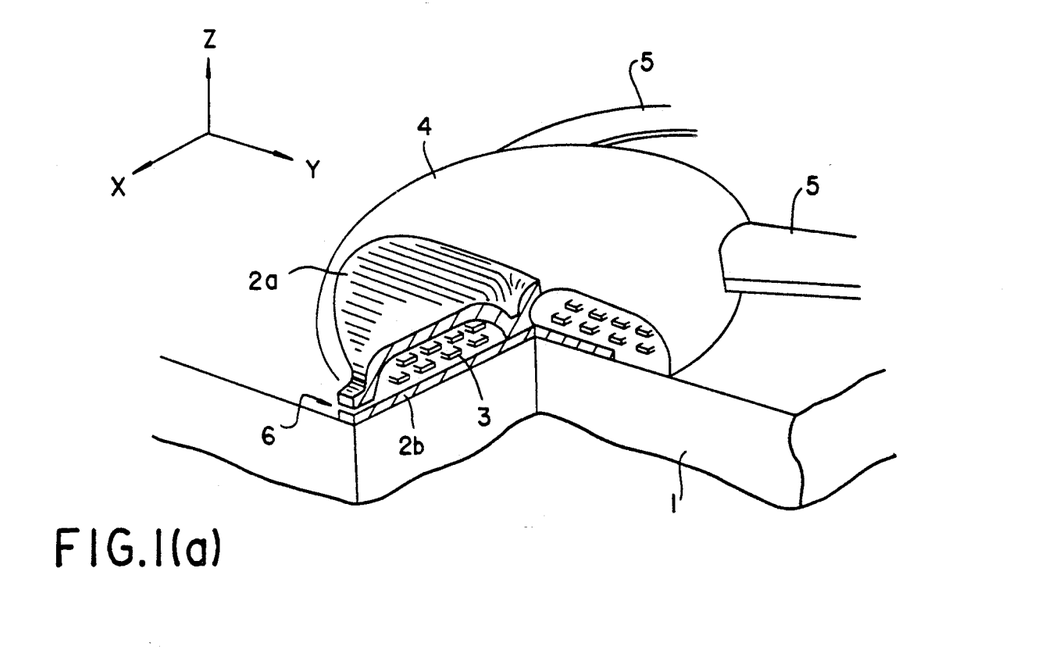
FIGS. 1(a) and 1(b) illustrate respectively a perspective view of a magnetic head with a part cut away and cross sectional view thereof for giving a general concept of the magnetic head structure.
Figure 1B:
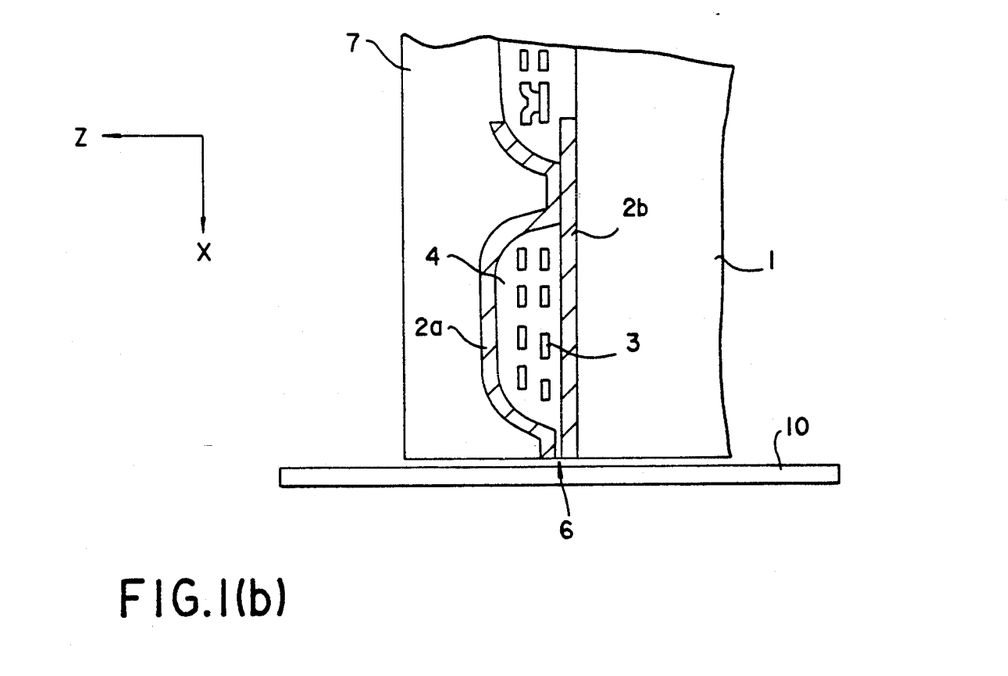

FIG. 1(a) is a perspective view of a thin film magnetic head, a portion thereof being removed for easy understanding, and FIG. 1(b) is a cross sectional view of this magnetic head. A substrate 1 is of a ceramic material such as $Al_2O_3TiC$. On substrate 1, a magnetic circuit is formed, which is composed of two magnetic films 2, namely, upper magnetic film 2a and lower magnetic film 2b. Two magnetic films are shaped in a manner that width at one end both films is made narrow and a small gap 6 is formed between the two ends. At the other opposite end portion, two magnetic films are made to contact with each other. Each of the magnetic films 2a and 2b is a single layer of permalloy and formed by depositing or plating the permalloy. A thin film coil 3 of copper is formed by plating and patterning before forming the upper magnetic film 2a, and the coil 3 is buried in an insulation layer 4 of thermosetting resin material, insulated from the magnetic films. The coils 3 surrounds the contacting portion of these two magnetic films 2. Two magnetic films 2 form a yoke of the magnetic circuit and the coil 3 interlinks the magnetic circuit. The coil 3 is provided with two leads wires 5 of thin film which are formed simultaneously with the coil 3 by plating copper. The gap 6 between the ends (poles) of magnetic films is buried with a sputtered aluminum oxide ($Al_2O_3$) layer, and the entire surface is covered with a protective layer 7 (not shown in FIG. 1(a)). The magnetic head is arranged close to a recording medium 10 of disk apparatus during write and read operations.

In a write operation, a signal current responding to write information is input from lead wires 5 and flows through the coil 3, which generates a leakage flux at the gap 6, which magnetizes the rotating recording medium 10. In a read operation, recorded information on the magnetic recording medium 10 includes magnetic flux in the magnetic circuit of magnet films 2, and the flux further induces a signal current in the coil 3 interlinked with the magnetic flux.

The above structure is a general description of the thin film magnetic head structure. Further, assuming that an orthogonal coordinate system is given as illustrated in FIGS. 1(a) and 1(b), it is generally known that, during fabrication of the magnetic films, a magnetic anisotropy (easy axis of magnetization) is given in the Y-direction, because this enhances a permeability of the magnetic film in the X-direction (hard axis of magnetization) which is coincident with the flux direction induced during write and read operations. Thus the magnetic head of the prior art has improved an efficiency in the write and read operations.

Figure 2:
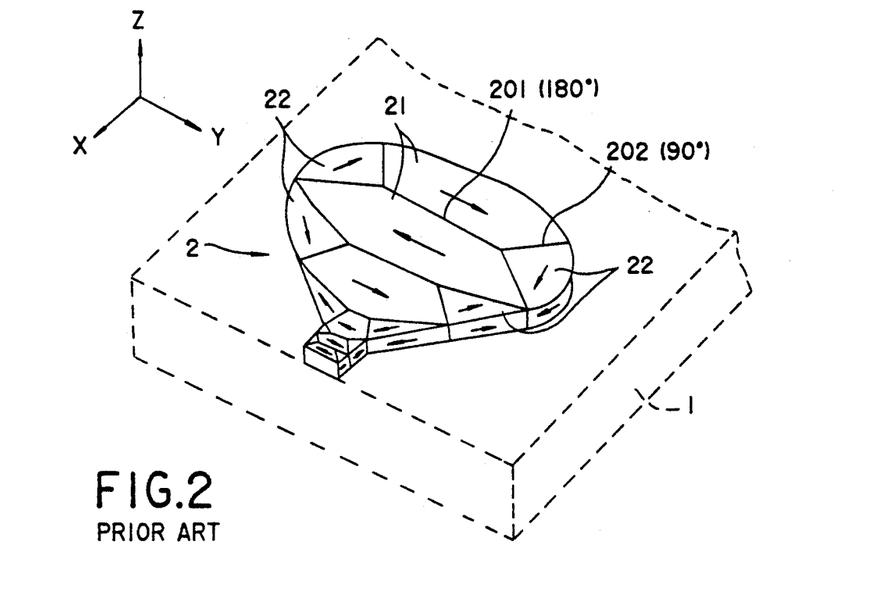
FIG. 2 shows schematically a magnetic domain structure in the magnetic film of the prior art in which flux contour domains are formed.

However, in an actual fabrication, completed thin magnetic film does not show a simple pattern of magnetization. FIG. 2 illustrates an exemplary pattern of magnetization, in which only a magnetic film 2 is shown on the substrate 1 and other parts are removed for the purpose of simplicity. A plurality of magnetic domains are formed divided by domain walls, each domain having different direction of magnetization. The reasons therefor are that a length of the magnetic film is finite in the Y-direction, which causes demagnetization field in the magnetic film, and that, in order to reduce the magnetostatic energy caused by the demagnetization field, flux closure domains are generated in the magnetic film. As the result, flux closure domains 22 in FIG. 2 are formed in which direction of magnetization is perpendicular to those in main domains 21. In other words, when external magnetic field is removed, magnetic domains are formed in a manner that directions of magnetization therein form a closed contour. A 180 degree domain wall 201 is formed between adjacent main domains 21, and a 90 degree domain wall is formed between flux closure domain 22 and main domain 21.

When the thin film magnetic head of the prior art as described above is subjected to an application of signal magnetic flux, rotation of magnetization occurs in the main domain 21 further the domain wall 202 defining closure domain 22 deforms or moves. There is not a definite relationship between the movement of domain wall and the applied magnetic field. In case that there is a phase difference between the signal flux and the domain wall movement, a reproduced signal comprises so-called "wiggle" noises, and in another case that, though domain wall movement is restricted by defect or impurity comprised in the magnetic substance, the domain wall suddenly moves, which generates so-called "popcorn" noises in a reproduced signal.

Figure 3A:
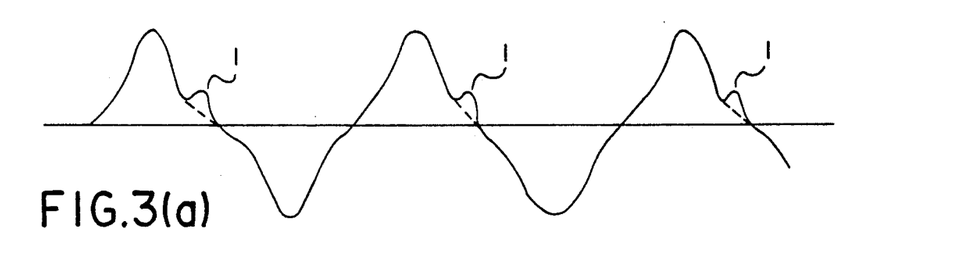
Figure 3B:
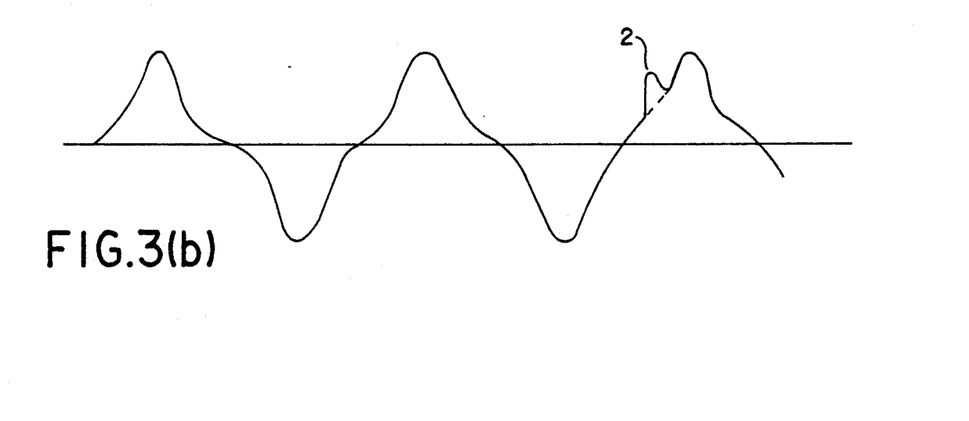

FIGS. 3(a) and 3(b) illustrate an exemplary reproduced signal waveform the magnetic head of the prior art. "Wiggles" are observed on a trailing portion of the waveform in FIG. 3(a), and "popcorn" is observed on indefinite portion of the waveform in FIG. 3(b).

In order to reduce "popcorn" noise, Japanese Unexamined Patent Publication Tokukai-Hei 2-312005 discloses a heat treatment method, in which a magnetic head subassembly composed of magnetic films, a coil and etc. is subjected to the heat treatment of 270° to 400° C. before forming a protective layer 7 (shown in FIG. 1(b)). However, it has been found that this method can not always eliminate such noises. For example, when a permalloy (NiFe) layer is used as the magnetic film and its magnetostriction coefficient λ is positive, the noise reduction can not be expected. In case when amorphous cobalt alloy layer is used as the magnetic film, either a heat treatment or a combination of the heat treatment and in-plane (hereinafter used to denote the parallel direction to the XY plane) magnetic anisotropy can not remove "popcorn" noises.

SUMMARY OF THE INVENTION

It is a general object of the invention, therefore, to provide a thin film magnetic head which will not produce noise as "wiggle" and "popcorn" noises in a reproduced signal during a read operation.

It is further object of the invention to provide a thin film magnetic head having high performance and high reliability.

Foregoing and related objects are accomplished by a magnetic head of the invention, the magnetic head comprising a substrate, upper and lower magnetic films forming a magnetic circuit on the substrate, the magnetic circuit having a narrow portion in width and forming a gap at the end of the magnetic circuit for interacting with a recording medium, and a coil surrounding the magnetic circuit and blurred in an insulation layer between the upper and lower magnetic films; and the magnetic head characterized in that magnetic films further comprises a magnetic anisotropy having components of an in-plane (parallel to the magnetic film surface) magnetic antisotropy Hp and a perpendicular (vertical to the magnetic film surface) magnetic anisotropy Hv. The perpendicular magnetic anisotropy Hv is given to the magnetic film by anyone among utilization of the inverse magnetostriction effect, an induced magnetic anisotropy and crystalline magnetic anisotropy.

Further details of the present invention will become clear from a reading of the detailed description of the embodiments with reference to the drawings.

BRIEF DESCRIPTION OF THE DRAWINGS

FIGS. 3(a) and 3(b) illustrate an exemplary reproduced signal waveform from the magnetic head of the prior art, and FIG. 3(a) shows "wiggles" noises on a trailing portion of the waveform and FIG. 3 (b) shows "popcorn" noise, FIGS.4 (a) (b) illustrates schematically a magnetic domain structure of the magnetic film in accordance with the present invention, in which parallel main domains are formed and contour domains are removed, FIGS. 9(a) and 9(b) show a BH curve of magnetic film (CoZrCr) with regard to a hard axis direction, in which

Throughout the drawings, the same reference numerals designate and identify the same or similar parts. Further, the same orthogonal coordinate system is used for denoting a specific direction with regard to the magnetic film of the invention.

DETAILED DESCRIPTION OF THE PREFERRED EMBODIMENTS

An embodiment of the present invention has no particular structural difference from those described referring to FIGS. 1(a) and 1(b), and therefore, the same reference numerals are used in the following description, and detailed explanation of the structure is omitted. Particular features of the invention are related with magnetic anisotropy given to magnetic films used in a magnetic head. The magnetic head without noises in a reproduced signal can be realized by giving a perpendicular magnetic anisotropy to the magnetic film together with an in-plane magnetic anisotropy, which will be made apparent as by the following embodiments.

(1) First Embodiment

In a first embodiment, a perpendicular (Z-axis) magnetic anisotropy is given to magnetic films 2 by utilizing a magnetostriction effect, and particularly in this embodiment, an inverse magnetostriction effect is utilized. Hereinafter, the term "magnetic films 2" is used to denote both upper and lower magnetic films 2a and 2b, and each magnetic film is a single layer of magnetic material.

During a forming step of the magnetic film of permalloy using a sputtering or plating process, a magnetic field is applied in the Y-direction and further a composition of nickel (Ni) comprise in the permalloy (NiFe) film is controlled such that a magnetostriction coefficient $\lambda$ is kept to be negative.

When the magnetic film is formed by the sputtering or plating process, tensile stress is generated in the magnetic film plane (particularly in the X-direction) and, as the result, the perpendicular anisotropy (Z-direction anisotropy) is realized in the magnetic film due to the inverse magnetostriction effect.

Figure 4A:
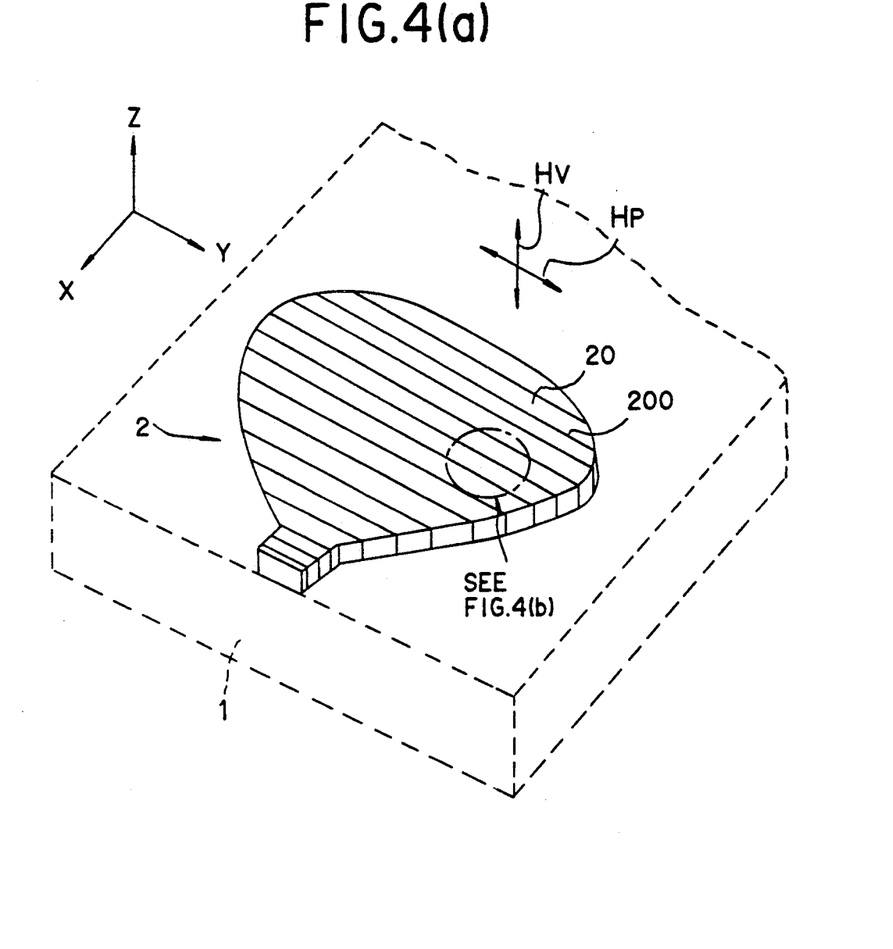
Figure 4B:
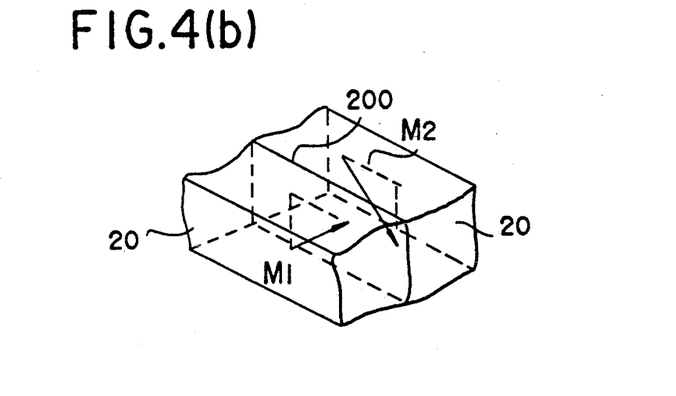

FIG. 4 illustrates a perspective view of a magnetic domain configuration of the magnetic film in accordance with the embodiment, in which a portion thereof is shown enlarged. In the figure, Hp and Hv denote a direction of an in-plane magnetic anisotropy and a perpendicular magnetic anisotropy respectively. A plurality of parallel magnetic domains are formed divided by parallel domain walls. Magnetizations in two adjacent domains 20 are shown by arrows $M_1$ and $M_2$ in the enlarged view in order to give a general idea. Each magnetization shows that it has both in-plane (Y-direction) and perpendicular (Z-direction) components of magnetic anisotropy. The above domain structure has been confirmed by the known Bitter method and by the observation of Kerr effect. Magnetization of each domain has the perpendicular component, direction of which is opposite to the perpendicular component of the adjacent magnetic domains. Magnetizations in two adjacent domains, each having a width (in the X-direction) of about 2 $\mu$m, are formed as if they form a closed magnetic path. Therefore, contour domains 22 such as shown in FIG. 2 can be avoided.

Figure 5:
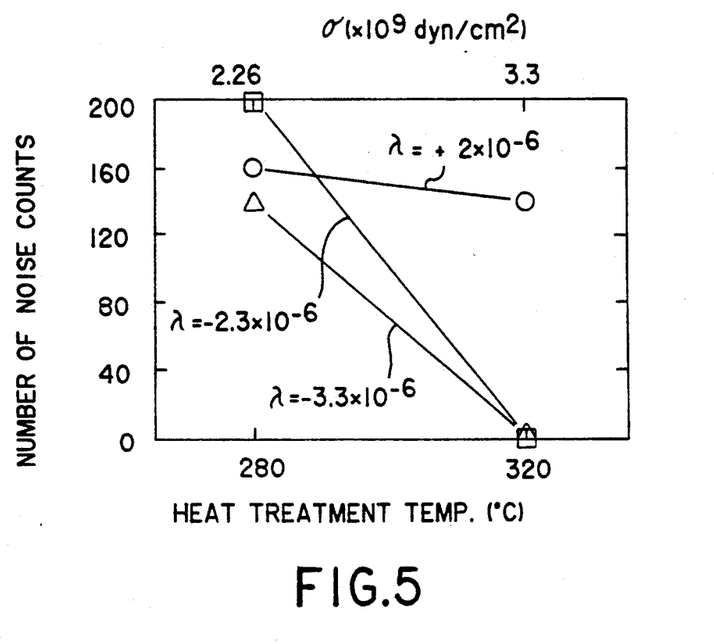
FIG. 5 is a graph showing a relation between heat treatment at different magnetostriction coefficients $\lambda$ and noise data.

It has been found that there is a difference in noise data depending on the forming condition of the magnetic film such as the permalloy composition, forming temperature, etc. FIG. 5 shows measured "popcorn" noise data versus a temperature during sputtering or plating process of the magnetic film. When the forming temperature is changed, a stress generated in the magnetic film also changes. The stress amount corresponding to the temperature data is measured and shown on the upper side of the abscissa. The stress of the magnetic film which is subjected to a heat-treatment, is a tensile force, therefore it has a positive value. In FIG. 5, three parameters are selected as a magnetostriction constant $\lambda$ by changing the content of nickel (Ni) in permalloy. When the content of Ni exceeds about 83.4%, $\lambda$ becomes negative, and when the content is reduced less than b 83.4%, $\lambda$ becomes positive. It is clearly seen from FIG. 5 that noise data does not show a remarkable reduction for the positive value of the parameter $\lambda$, however, noise data for two negative different parameter values shows a rapid decrease with a temperature rise. Therefore, it is preferable to use the permalloy having Ni content greater than about 83.4% in this embodiment.

Figure 6:
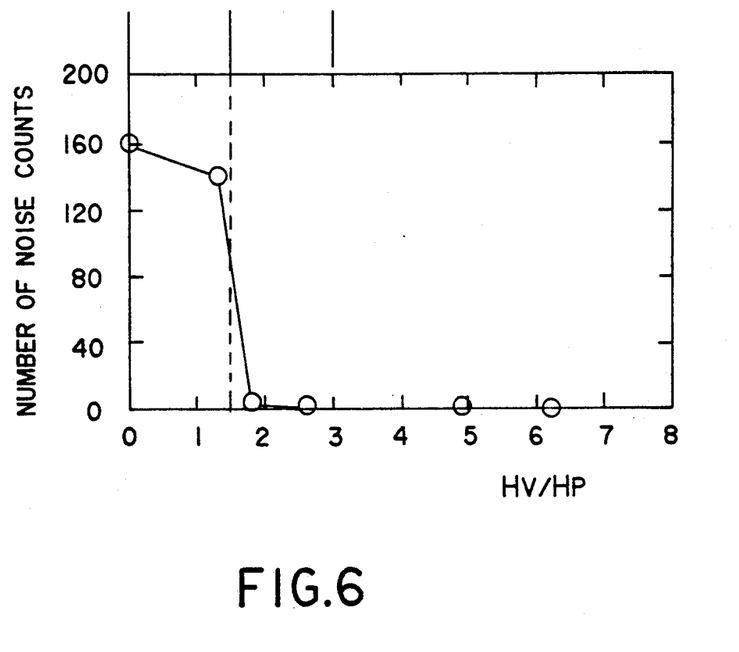
FIG. 6 is a graph showing a relation between Hv/Hp and noise data.

FIG. 6 shows another noise data when the ratio of perpendicular anisotropy Hv to in-plane anisotropy Hp is changed. For a region of Hv/Hp < 1.5, the perpendicular anisotropy Hv is not sufficient to reduce the noise. In order to reduce noise, the perpendicular anisotropy should satisfy the condition of Hv/Hp > 1.5.

Figure 7:
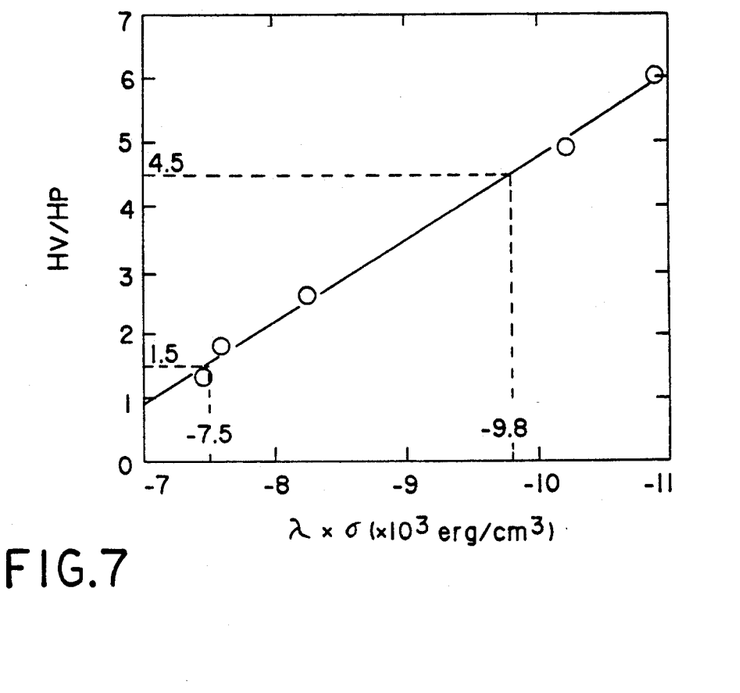
FIG. 7 is a graph showing a relation between $\lambda \times \sigma$ and Hv/Hp.

Combining these data of FIGS. 5 and 6, the necessary condition of Hv/Hp > 1.5 can be rewritten in a form of $\lambda \times \sigma$, which is shown in FIG. 7. The necessary condition of Hv/Hp > 1.5 is transformed to $\lambda \times \sigma < -7.5 \times 10^3$ erg/cm$^3$.

Figures 8A, 8B, 8C:
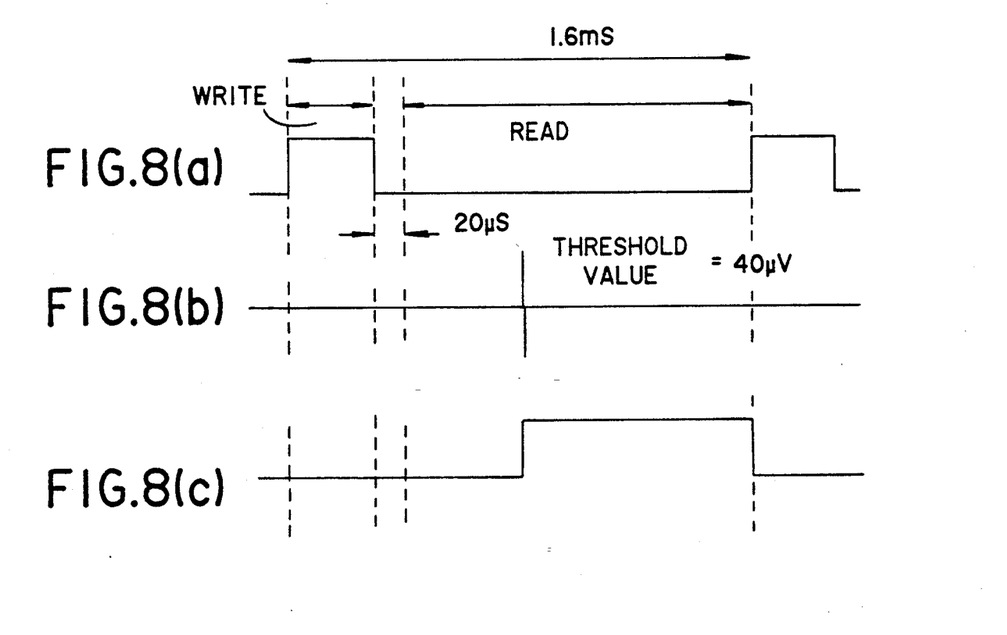
FIG. 8 illustrates schematically a time chart for each step of noise test, in which (a) shows a wire current applied to a coil of magnetic head, (b) shows detected "popcorn" noise, and (c) shows a detection current for a counter circuit.

The noise data shown in FIGS. 5 and 6 denotes a number of detected counts of "popcorn" noise for 6,250 cycles of write and read (detection) test. FIG. 8 illustrates schematically a time chart of single test step. In FIG. 8, waveform data (a) shows a write current applied to a coil of magnetic head, the write cycle having a 1.6 mS period. A read period for noise begins after 20 $\mu$S pause time and continues until the next write period. The "popcorn" noise greater than a threshold value of 40 $\mu$V is detected as shown by data (b) and generates a signal (c) for a counter circuit.

Tests for checking "wiggle" noise are also performed. it is found that the "wiggle" noise is also eliminated for the embodiment magnetic head.

(2) Second Embodiment

A second embodiment of the present invention utilizes cobalt alloy for forming magnetic films 2. The magnetic film is formed by sputtering cobalt alloy such as CoZrCr, CoZr, CoZrNb and CoZrMo, and further a magnetic field is applied in the Y-direction during the sputtering process. After fabrication of two magnetic films 2b and 2a in this way, the finished subassembly is subjected to a heat treatment of higher than 250° C. applying simultaneously a magnetic field in the Z-direction (vertical to the film surface) having a strength of a few hundreds Oe.

Figure 9A:
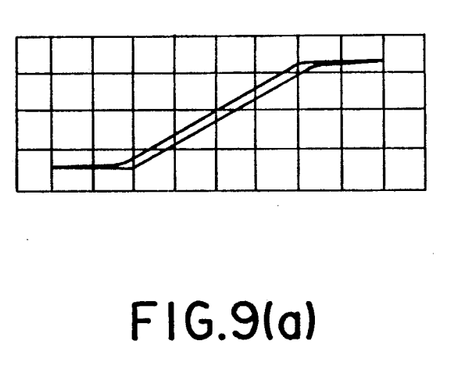
FIG. 9(a) shows the BH curve for the magnetic head having no perpendicular magnetic anisotropy with the resulting of noise problem.
Figure 9B:
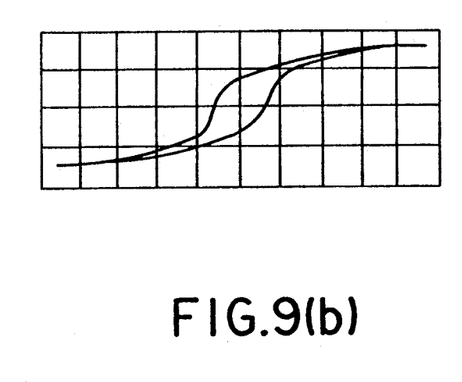
FIG. 9(b) shows the BH curve for the magnetic head having a perpendicular magnetic anisotropy in accordance with the present invention resulting in removing noises.

The completed head assembly is tested for a BH characteristic in a hard axis direction (X-direction). FIG. 9(a) shows the BH curve for the magnetic head without applying Z-direction magnetic field during the above heat treatment, and FIG. 9(b) shows the same with applying the Z-direction magnetic field. The BH curve of FIG. 9(a) has a desirable pattern as a magnetic characteristic alone of the magnetic head, however, it follows a noise problem. The BH curve of FIG. 9(b) in accordance with the second embodiment of the invention clearly shows a perpendicular magnetic anisotropy (vertical to the magnetic film surface) is induced in the magnetic films (induced magnetic anisotropy). The embodied magnetic heads are tested and found to have an improved characteristic in noise as in the first embodiment.

(3) Third Embodiment

A third embodiment utilizes a perpendicular magnetic anisotropy which appears in a crystalline structure of magnetic material. Permalloy (NiFe alloy) has a crystalline structure of face-centered cubic, and its anisotropy constant K is negative. Therefore, the crystalline magnetic anisotropy appears in the direction [111] of permalloy crystalline structure. When permalloy film is formed in a way that vertical direction to the film surface is coincident with the [111] direction, the magnetic films thus formed have the perpendicular magnetic anisotropy (Z-direction) resulting in reducing spurious and transient noises in a reproduce signal from the magnetic head.

In an actual fabrication method, a permalloy film is first formed by sputtering or plating process, and thereafter head subassembly thus formed is subjected to a heat treatment above 300° C., which results in recrystallizing the permalloy films and giving the crystalline magnetic anisotropy to the magnetic films, the direction of the anisotropy being coincident with the vertical direction to the film surface.

Through the first to the third embodiments, it is a common feature that magnetic head of the invention comprises the magnetic film having a perpendicular magnetic anisotropy together with an in-plane magnetic anisotropy. Magnetic domains in the embodied magnetic film have a tendency to form a closed path of magnetization by movements of the neighboring magnetic domains. The closed path is formed not only in the surface direction of the magnetic film but also in the thickness direction thereof. The magnetic structure in the thickness direction shows a fine changing domain structure with the result of avoiding a large flux contour domain 22 in the XY-plane of the prior art.

Since the flux contour domain is considered to be the cause of "popcorn" noise and "wiggle" noise in a reproduced signal, the magnetic head without the contour domain in accordance with the present invention is not influenced by such noises, and it has high quality and high reliability.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalence of the claims are, therefore, to be embraced therein.

What is claimed is:

1. A magnetic head, comprising:
    a substrate;
    upper and lower magnetic films forming a magnetic circuit on the substrate, the magnetic circuit having a narrow portion in width and forming a gap at the end of the magnetic circuit for interacting with a recording medium; and
    a coil surrounding the magnetic circuit and buried in an insulation layer between the upper and the lower magnetic films;
    each of said magnetic films further comprising a magnetic anisotropy having components of an in-plane magnetic anisotropy Hp which is parallel to the magnetic film surface, a transverse direction being defined for a width direction of the magnetic film, and a perpendicular magnetic anisotropy Hv which is vertical to the magnetic film surface.

2. A magnetic head as recited in claim 1, wherein each of the magnetic films comprises a plurality of magnetic domains, each of said magnetic domains having a stripe pattern and arranged substantially in parallel to said transverse direction, wherein flux contour domains at a periphery of the magnetic film are eliminated.

3. A magnetic head as recited in claim 2, wherein a magnetic anisotropy given to each of said magnetic domains comprises said transverse-direction component and said perpendicular component, and two adjacent magnetic domains having a domain wall in common have said perpendicular components opposite to each other.

4. A magnetic head as recited in claims 1 or 2, wherein each of said upper and lower magnetic films forming a magnetic circuit is a single layer of magnetic material.

5. A magnetic head as recited in claim 1, wherein said coil is disposed in a space formed between said upper and said lower magnetic films, said coil having an open area in a central portion thereof.

6. A magnetic head as recited in claim 5, wherein said upper and lower magnetic films contact each other in said open area in said central portion of said coil, and wherein said space is filled with an insulation material which encases said coil.

7. A magnetic head as recited in anyone of claims 1 or 2, wherein said perpendicular magnetic anisotropy $H_v$ is greater than 1.5 times said in-plane magnetic anisotropy $H_p$.

8. A magnetic head as recited in anyone of claims 1 or 2, wherein said magnetic film is of NiFe alloy, and said perpendicular magnetic anisotropy $H_v$ is given by an inverse magnetostriction effect of said magnetic film, and a product of a magnetostriction coefficient $\lambda$ of the magnetic film and a stress $\sigma$ applied thereto, namely, $\lambda \times \sigma$ is less than $-7.5 \times 10^3$ erg/cm$^3$.

9. A magnetic head as recited in claim 8, wherein a nickel content in said NiFe alloy is greater than about 83.4%.

10. A magnetic head as recited in anyone of claims 1 or 2, wherein said magnetic film is of NiFe alloy, and said perpendicular magnetic anisotropy $H_v$ is a crystalline magnetic anisotropy which is given by forming said magnetic film such that the vertical direction to the magnetic film is coincident with the axis of the NiFe crystalline structure.

11. A magnetic head as recited in claim 10, wherein said magnetic film is formed by depositing/plating NiFe alloy and thereafter recrystallizing the NiFe layer.

12. A magnetic head as recited in anyone of claims 1 or 2, wherein said magnetic film is of cobalt alloy, and said perpendicular magnetic anisotropy $H_v$ is an induced magnetic anisotropy, which is given by applying a magnetic field vertical to the magnetic film surface.

13. A magnetic head as recited in claim 12, wherein said cobalt alloy is anyone selected among CoZrCr, CoZr, CoZrNb, and CoZrMo.

* * * * *